(12) United States Patent
Everlith

(10) Patent No.: US 7,314,221 B1
(45) Date of Patent: Jan. 1, 2008

(54) DRIVER CONTROLLED WEDGE AND TRACK BAR ADJUSTORS

(76) Inventor: Clifford Everlith, P.O. Box 5760, Apache Junction, AZ (US) 85278

( * ) Notice: Subject to any disclaimer, the term of this patent is extended or adjusted under 35 U.S.C. 154(b) by 350 days.

(21) Appl. No.: 11/100,269

(22) Filed: Apr. 5, 2005

Related U.S. Application Data

(60) Provisional application No. 60/604,094, filed on Aug. 23, 2004.

(51) Int. Cl.
B60G 17/00 (2006.01)
B60G 17/015 (2006.01)

(52) U.S. Cl. ............... 280/5.509; 280/5.519; 280/124.103

(58) Field of Classification Search ........... 280/5.508, 280/5.509, 5.511, 5.519, 124.103, 124.106, 280/124.107; 267/177; 188/299.1
See application file for complete search history.

(56) References Cited

U.S. PATENT DOCUMENTS

| | | | |
|---|---|---|---|
| 2,746,069 A * | 5/1956 | Domenico | 15/4 |
| 3,131,950 A * | 5/1964 | Weaver, Jr. et al. | 280/6.154 |
| 3,600,002 A * | 8/1971 | Benwell | 280/6.15 |
| 3,944,247 A * | 3/1976 | Cook | 280/124.179 |
| 4,168,075 A | 9/1979 | Matschinsky | |
| 4,621,833 A | 11/1986 | Soltis | |
| 5,186,486 A | 2/1993 | Hynds et al. | |
| 5,287,277 A * | 2/1994 | Mine et al. | 701/37 |
| 5,306,031 A * | 4/1994 | Quinn et al. | 280/6.15 |
| 5,553,836 A * | 9/1996 | Ericson | 267/286 |
| 6,260,859 B1 * | 7/2001 | Dixon et al. | 280/5.514 |
| 6,367,831 B1 * | 4/2002 | Lim et al. | 280/124.102 |
| 6,565,412 B1 * | 5/2003 | Thrasher | 446/465 |
| 6,637,757 B2 | 10/2003 | Ignatius et al. | |
| 6,698,767 B2 | 3/2004 | Hagan | |
| 6,895,915 B2 * | 5/2005 | Hemphill | 123/179.25 |
| 7,062,367 B2 * | 6/2006 | Kim | 701/37 |
| 2003/0111816 A1 | 6/2003 | Carlstedt et al. | |
| 2003/0116928 A1 | 6/2003 | Heller et al. | |
| 2004/0061100 A1 | 4/2004 | Keaton et al. | |

* cited by examiner

*Primary Examiner*—Paul N. Dickson
*Assistant Examiner*—Joseph Rocca
(74) *Attorney, Agent, or Firm*—Schmeiser Olsen & Watts LLP

(57) ABSTRACT

A driver controlled wedge and track bar adjustor for a race car. A controller located inside the driver's compartment of the race car is coupled to a drive which is operatively coupled to adjusting rods. The controller may be configured to initiate a predetermined amount of rod adjustment. Wherein the operative coupling may consist of a system of pulleys and belts and the like which transfer the motion of the drive to the adjusting rods. The adjusting rods are already present in many race cars and are used to adjust the wedge or track bar of the vehicle during pit stops. A visual display may also be attached which shows the state of the wedge or track bar.

18 Claims, 3 Drawing Sheets

DRIVER CONTROLLED WEDGE AND TRACK BAR ADJUSTORS

This application claims priority to U.S. Provisional Application Ser. No. 60/604,094, filed Aug. 23, 2004, by Clifford Everlith and entitled "DRIVER CONTROLLED WEDGE AND TRACK BAR ADJUSTORS", which is incorporated herein by reference in its entirety.

BACKGROUND OF THE INVENTION

1. Technical Field

This invention relates to driver controlled wedge and track bar adjustors for use in racing vehicles, particularly those used in NASCAR.

2. Background Art

Car racing is a very precise operation. Cars perform differently depending on many different factors including the tires, the temperature of the track, how the weight is positioned in the vehicle and even the angle of the rear axle with respect to the front axle and the like. Many of these factors can be altered by the pit crew during stops in the race.

In racing, cars are often described as either tight or loose. The front wheels of a tight car lose traction before the rear wheels do. A tight car does not steer sharply enough on the turns and continues toward the wall. In a loose car, the rear tires of the car have trouble sticking in the turns. This causes loose cars to slip and fishtail.

How loose or tight a car is depends on many factors that can be altered in a pit stop during the race. Two common alterations made to vehicles during pit stops include track bar adjustments and wedge adjustments. Wedge refers to the relationship from corner-to-corner of the weight of the race vehicle. Increasing the weight on any corner of the vehicle affects the weight on the other three corners in direct proportion. A typical adjustment for a "loose" car would be to increase the weight of the left rear corner of the vehicle, which decreases the weight of the left front and right rear corners, and increases the weight of the right front. A typical adjustment for a "tight" vehicle would be to increase the weight of the right rear corner, which decreases the weight of the right front and left rear and increases the weight of the left front. Wedge adjustments are made by turning weight jacking screws mounted on each corner of the vehicle with a ratchet.

The track bar locates the vehicle's rear end housing from left-to-right. Raising or lowering the track bar changes the rear roll center and determines how well the car will travel through the corners. Typically, lowering the track bar will "tighten" the vehicle and raising the track bar will "loosen" it. The track bar is conventionally adjusted through the rear window of the vehicle using an extended ratchet.

During a race, cars are adjusted during pit stops. The cars are then sent back out on the track for another 40 or 50 miles or more before there is another pit stop. This means that if the adjustment did not fix the problem the car was having, or if the adjustment created a problem, then the driver has to try and cope with the problem until the next pit stop. This often results in wrecks that can destroy several cars and may even take the lives of the drivers.

Accordingly, what is needed are improvements in wedge and track bar adjustors for race cars that enable increased frequency of adjustment without the significant loss of time attributed to pit stops.

DISCLOSURE OF THE INVENTION

The present invention may be readily adapted to a variety of racing vehicles, particularly those used in NASCAR races. Embodiments of the present invention may provide, among other benefits: a way to adjust the wedge or track bar of the car from within the car while racing. This invention may save lives because it would allow drivers to fix some of the problems their car may be having while they are driving, instead of having to wait for the next pit stop. This may prevent accidents and potentially save millions of dollars worth of race cars and medical expenses.

In particular embodiments, adjustors are included that comprise a drive coupled to a controller, the drive also being operably coupled to an already existing wedge or track bar adjusting rod.

The foregoing and other features and advantages of the invention will be apparent to those of ordinary skill in the art from the following more particular description of the invention and the accompanying drawing.

BRIEF DESCRIPTION OF THE DRAWINGS

The invention will hereinafter be described in conjunction with the appended drawings where like designations denote like elements, and.

DESCRIPTION OF THE INVENTION

As discussed above, embodiments of the present invention relate to driver controlled wedge and track bar adjustors. Generally, an adjustor configured according to an embodiment of the present invention may include a drive coupled to a controller and an already existing adjusting rod.

In order to allow manual manipulation of the wedge and track bar on a race car, the cars are configured with adjusting rods. There are two wedge adjusting rods. They are located at each of the two rear corners of the vehicle. Conventional race cars also include one track bar adjusting rod that is placed in the back of the vehicle and accessed through the rear window. In order to adjust the wedge or the track bar on the race car, a ratchet is used to rotate the appropriate adjusting rod. The present invention provides a mechanism that allows for rotation of the adjusting rod while the vehicle is in motion.

Figure 1:
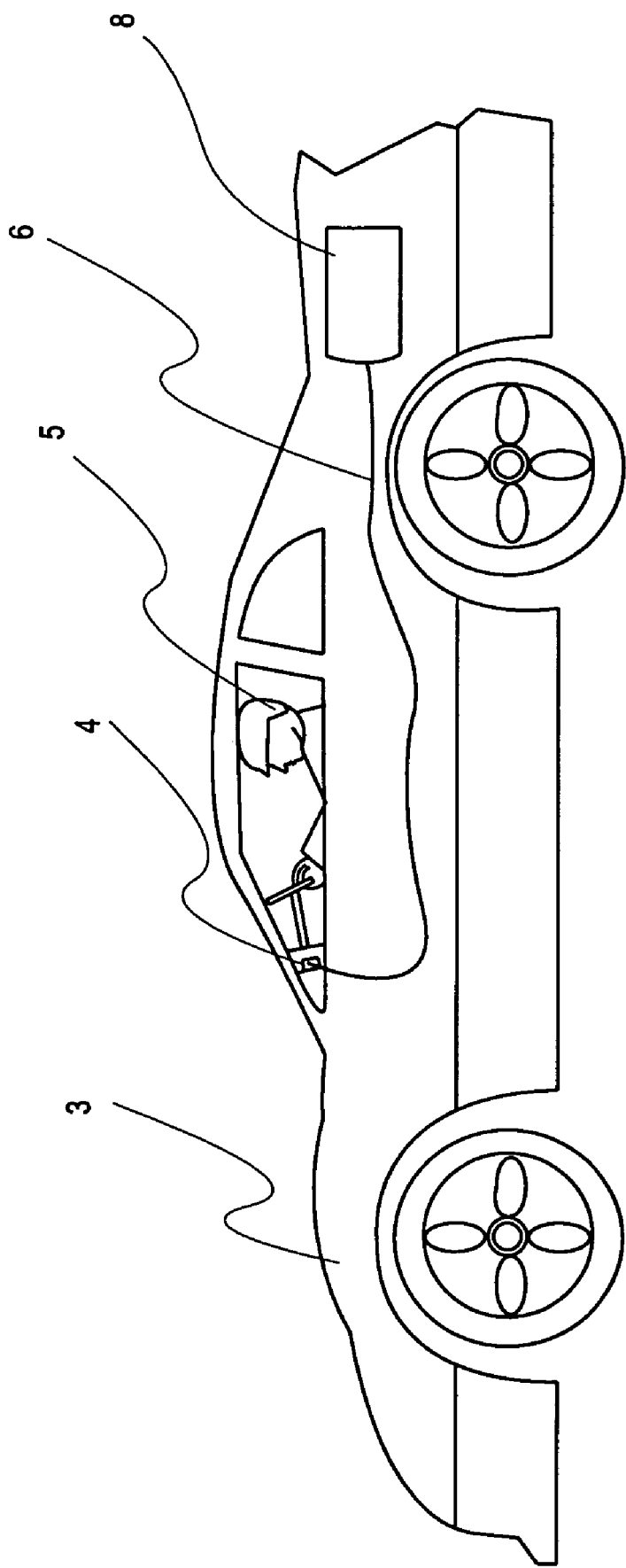
FIG. 1 is a side view of a race car configured according to an embodiment of the present invention.

FIG. 1 illustrates a race car 3 containing a driver controlled wedge and track bar adjustor configured according to an embodiment of the present invention. The driver 5 can adjust the wedge or the track bar through a controller 4. The controller 4 may be anything that allows the driver 5 to choose the direction and duration of the adjustment. The controller 4 should also be large enough to allow a driver 5 wearing gloves to manipulate it. For instance, the controller 4 may be a rocker switch, button, directional pad, or the like. When the driver 5 presses down on the rocker switch 4, wedge is added or the track bar is tilted in a certain direction. When the driver 5 releases the controller 4, the adjustments stop. When the driver 5 presses up on the rocker switch 4, wedge is removed or the track bar is tilted in the opposite direction from before. This allows the driver 5 to control the amount and direction of adjustment.

It is contemplated that there may be multiple controllers 4. For example, there may be two controllers 4 for the wedge. One controller 4 would add wedge to the driver's side (left side) of the race car, and the other one would add wedge to the right side. This aspect of the invention may also be accomplished by combining the two controllers 4 into one by using a directional pad 4. A directional pad is a controller 4 which has more options than simply "on" and "off" or even "forward", "reverse" and "off". The directional pad allows the driver 5 to choose which corner of the vehicle 3 wedge should be added or removed from. The directional pad allows multiple controllers 4 to be combined into one. In this way, the driver 5 could simply manipulate the directional pad in order to direct the adjustor to add wedge to a specific corner of the vehicle 3. It is contemplated that a separate controller 4 may be used for adjusting the track bar.

Traditionally, the amount that the wedge or track bar is adjusted is measured by the number of turns of the ratchet required. Using the present invention, measurements can be made on the number of turns, and/or other measurements, such as the number of seconds that the controller 4 must be held down to adjust the wedge or track bar a certain amount. The controller 4 could also be configured with a predetermined time or distance adjustment. For example, each time the controller 4 is pressed it may yield an automatic two second or one rotation adjustment, or any other preferred time frame or amount of rotation. In this way the driver 5 can simply press and release the controller 4 and does not have to guess at the amount of change being affected. In alternate embodiments, mechanical or electronic visual displays may be used to indicate the state of the wedge or track bar so that the adjustments can be measured. Multiple visual displays may be used in order to display the readings for the wedge on different corners of the vehicle 3 or for the position of the track bar. In yet another alternate embodiment, multiple visual displays may be combined into a single visual display with the ability to show all of the information concerning the wedge and the track bar at once, or else it could provide the ability to change the visual display in order to obtain the desired information. At least one restore button is also contemplated to restore any in-car adjustments back to their settings before any in-car adjustments were made. A restore option and button may be included for each wedge or track bar adjusting rod.

The controller 4 may be placed anywhere in the car 3 that is convenient and accessible. Particular embodiments of the invention include the controller 4 being placed on the steering wheel or even somewhere on the dashboard. A danger that may be associated with placing the controller 4 on the steering wheel, however, is that the controller 4 may accidentally be pressed during turns or other maneuvers. Accordingly, appropriate safety precautions should be taken.

The controller 4 is coupled 6 to a system for adjusting the wedge and/or track bar 8. The controller 4 is connected 6 to the system 8 through wiring or some other method such as through radio waves or other short range wireless communication. The controller 4 should be coupled to the system 8 in such a way that the driver 5 in the cab of the car 3 can control the system 8 through the controller 4. FIG. 1 shows coupling of the controller 4 to the system 8 through electrical wiring, though wireless or other forms of electrical, and mechanical couplings are also contemplated.

Figure 2:
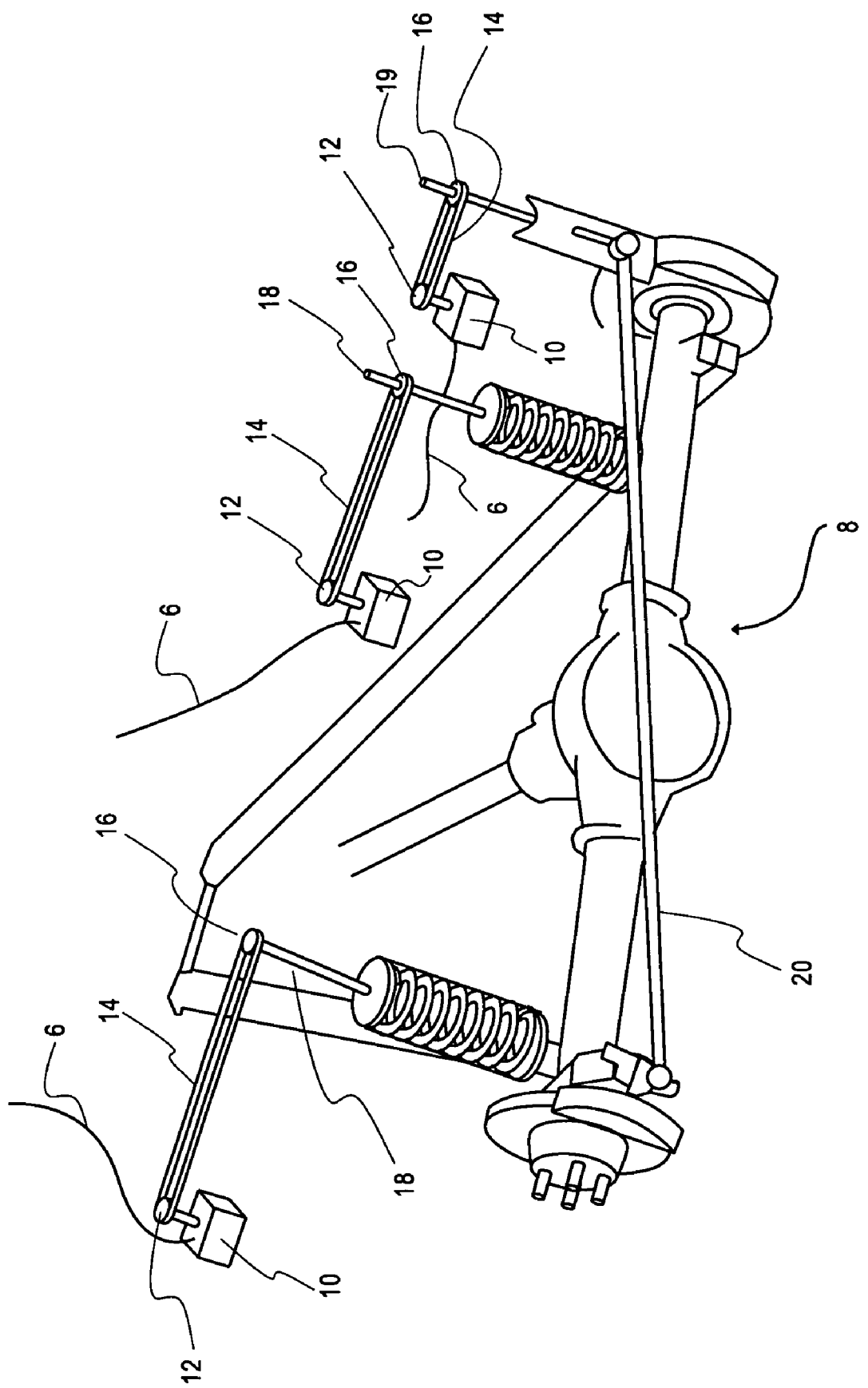
FIG. 2 is a front view of a rear of a race car with a driver controlled wedge and track bar adjustor configured according to an embodiment of the present invention.
Figure 3:
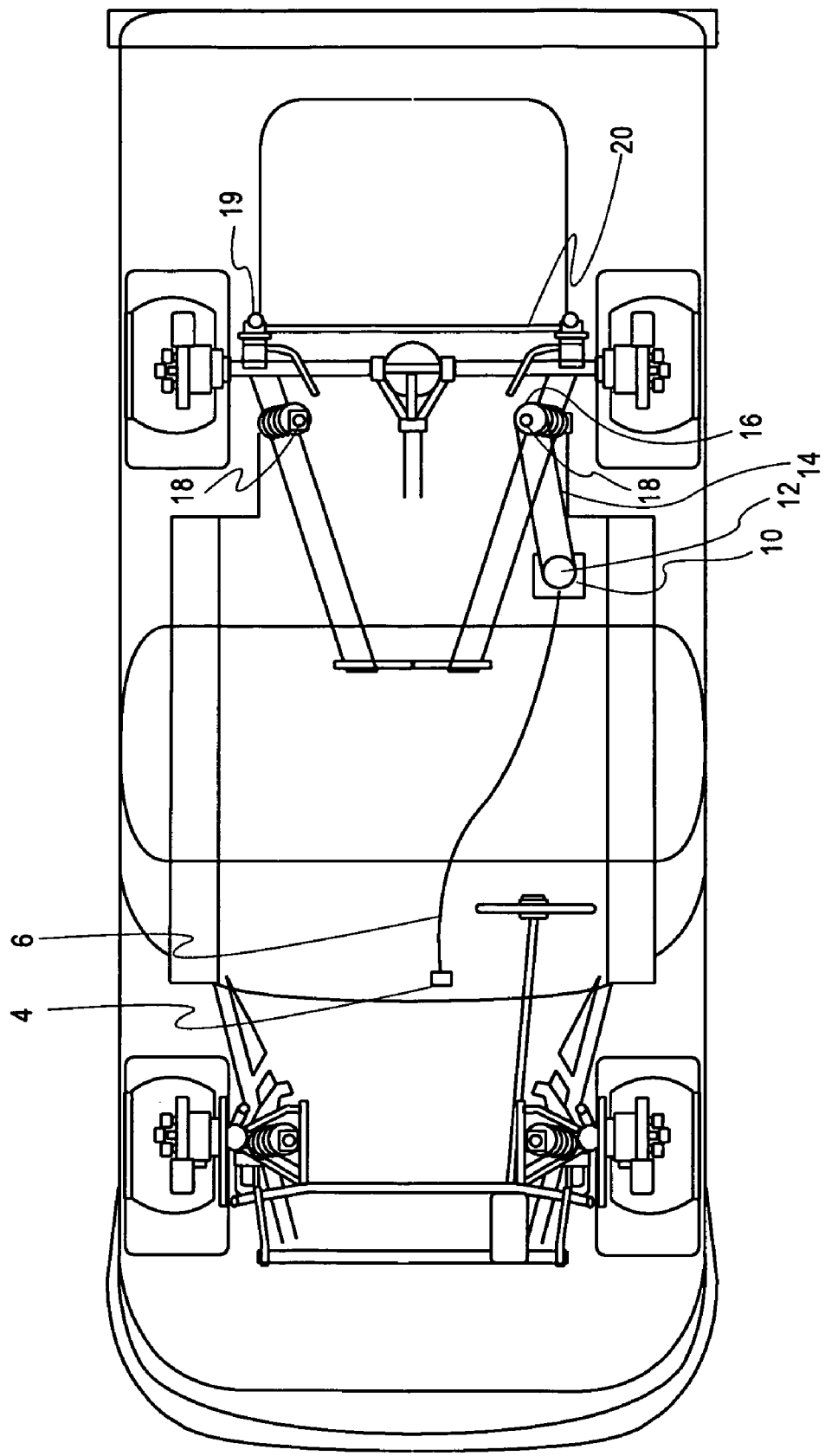
FIG. 3 is a top view of a suspension of a race car with a driver controlled wedge and track bar adjustor configured according to an embodiment of the present invention.

FIGS. 2 and 3 illustrate a system 8 for adjusting the wedge and/or track bar 20 configured according to an embodiment of the present invention. The system 8, which is controlled by the controller, consists of a drive 10 that is operably coupled 6 to the adjusting rods 18 and 19 that are built into many race cars, particularly those used in NASCAR races. The drive 10 may be anything that provides power to adjust the wedge or track bar 20. The drive 10 may function to allow wedge to be added or removed. In a particular embodiment of the present invention, a reversible gear motor reduction unit may be used as the drive 10.

The drive 10 may be operably coupled to the adjusting rods 18 and 19. This operable first coupling 12 may include a first sprocket, gear or pulley attached to the drive 10. The first coupling 12 should be fixed in a way that allows force and rotation from the drive 10 to be transferred from the drive 10 to the first coupling 12 and then to the rest of the system 8. The first coupling 12 would then be connected to a second coupling 14 such as a chain, timing belt or belt. When the drive 10 is turned on by the driver pressing on the controller, the first coupling 12 rotates moving the second coupling 14 which in turn is attached to a third coupling 16, such as a sprocket, gear or pulley. The third coupling 16 is fixed to the wedge or track bar adjusting rod 18 and 19. This third coupling 16 should also be firmly affixed to the adjusting rod 18 and 19 in a way that allows force and rotation to be transferred from the third coupling 16 to the adjusting rod 18 and 19. The wedge or track bar adjusting rod 18 and 19 is already present in a standard wedge or track bar 20 on a race car. When the third coupling 16 is rotated by the second coupling 14, the wedge or track bar adjusting rod 18 and 19 is also rotated, thereby adjusting the wedge or track bar 20.

Any of the couplings 12, 14 and 16 may use sprockets and chains, pulleys and belts or even gears and timing belts and the like. More or fewer coupling components may also be used. An important factor, however, in designing the operable coupling system is to have as little slipping as possible. This is because accurate adjustments are important to safety and any slipping makes the determination inaccurate.

Just as multiple controllers 4 may be used to control all of the wedge and track bar adjusting rods 18 and 19, multiple drives 10 may be operably coupled to the multiple adjusting rods 18 and 19.

In order to determine the amount of time required pressing the controller to equal one rotation of the ratchet, the dimensions of the coupling members 12, 14 and 16 must be compared. If, for example, two sprockets 12 and 16 are the same size, then one rotation of the first sprocket 12 attached to the drive 10 is equal to one rotation of the wedge or track bar adjusting rod 18 and 19. If, however, the second sprocket 16 attached to the adjusting rod 18 and 19 is smaller than the first sprocket 2 attached to the drive 10, then one turn of the drive 10 could equal several turns of the adjusting rod 18 and 19. Therefore, the dimensions of the coupling members may be adjusted to create the optimum rotation timing.

If a mechanical or electrical malfunction occurs, such as the drive 10 breaking or a belt 14 breaking, which disables the in-car control of the wedge and/or track bar 20, then the chain, belt or timing belt 6 can simply be cut or otherwise removed and the wedge and track bar 20 can once again be adjusted manually.

In utilizing this adjustor, the driver 5 of a race car 3 determines whether to add or subtract wedge or the direction to shift the track bar. The driver 5 then presses on the appropriate controller 4. The controller 4 starts the drive 10. The motion of the drive 10 is transferred through an operable coupling 20 to the desired adjusting rod 18 and 19. For example, the operable coupling 20 could consist of a first sprocket 12 which is rotated by the drive 10. The first sprocket 12 moves a chain 14 that is also connected to a second sprocket 16. This second sprocket 16 is moved by the chain 14 and in turn rotates the adjusting rods 18 and 19.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. A driver controlled wedge and track bar adjustor for a racing vehicle, said adjustor comprising:
   at least one controller located inside the driver's compartment of the vehicle;
   at least one reversible drive coupled to the at least one controller;
   at least one adjusting rod of a racing vehicle, the rod being operatively coupled to the drive wherein manual operation of the controller activates the drive to adjust at least one of the wedge and the track bar for the racing vehicle; and
   wherein the at least one reversible drive comprises at least two reversible drives, the at least one adjusting rod comprises at least two adjusting rods, wherein the at least one controller is coupled to the two reversible drives which are each separately coupled to one of the two adjusting rods that adjust at least one of the wedge and the track bar for the racing vehicle.

2. The adjustor of claim 1, wherein the at least one adjusting rod adjusts the wedge of the racing vehicle.

3. The adjustor of claim 2, further comprising a visual display wherein the visual display displays a state of the wedge.

4. The adjustor of claim 1, wherein the adjusting rod is operatively coupled to the drive through a coupling comprising a first sprocket coupled to the drive, said first sprocket being coupled to a chain and said chain being coupled to a second sprocket coupled to the at least one adjusting rod.

5. The adjustor of claim 1, wherein the adjusting rod is operatively coupled to the drive through a coupling comprising a first pulley coupled to the drive, said first pulley being coupled to a belt and said belt being coupled to a second pulley which is also coupled to the at least one adjusting rod.

6. The adjustor of claim 1, further comprising a restore button coupled to the at least one controller and operatively configured to restore the at least one adjusting rod to a conditional state of the adjusting rod prior to any in-vehicle adjustments.

7. The adjustor of claim 1, wherein the at least one controller initiates a predetermined amount of rotation of the adjusting rod.

8. The adjustor of claim 1, wherein the adjusting rod is operatively coupled to the drive through a coupling comprising a first gear coupled to the drive, said first gear being coupled to a timing belt and said timing belt being coupled to a second gear which is also coupled to the at least one adjusting rod.

9. The adjustor of claim 1, wherein the at least one adjusting rod is coupled to the track bar of the racing vehicle.

10. The adjustor of claim 9, further comprising a visual display wherein the visual display displays the state of the track bar.

11. The adjustor of claim 1, wherein the at least one controller is a rocker switch.

12. A driver controlled wedge and track bar adjustor for a racing vehicle, said adjustor comprising:
    at least one controller located inside the driver's compartment of the vehicle;
    at least one reversible drive coupled to the at least one controller;
    at least one adjusting rod operatively coupled to the drive, wherein manual operation of the controller activates the drive to adjust at least one of the wedge and the track bar for the racing vehicle;
    at least one visual display which shows a state of at least one of the wedge and the track bar;
    wherein the at least one controller initiates a predetermined amount of rod rotation; and
    wherein the at least one reversible drive comprises at least two reversible drives, the at least one adjusting rod comprises at least two adjusting rods, wherein the controller is coupled to the two reversible drives which are each separately coupled to one of the two adjusting rods that adjust at least one of the wedge and the track bar for the racing vehicle.

13. The adjustor of claim 12, the at least one controller comprising at least two controllers, wherein each of the two controllers is coupled to a separate one of the two reversible drives that are each separately coupled to one of the two adjusting rods that adjust the wedge.

14. The adjustor of claim 12, wherein the controller is a directional pad.

15. The adjustor of claim 12, further comprising at least one restore button coupled to the at least one controller and operatively configured to restore the at least one adjusting rod to a conditional state of the adjusting rod prior to any in-vehicle adjustments.

16. The adjustor of claim 12, wherein the adjusting rod is operatively coupled to the drive through a coupling comprising a first gear coupled to the drive, said first gear being coupled to a timing belt and said timing belt being coupled to a second gear which is also coupled to the at least one adjusting rod.

17. The adjustor of claim 12, wherein the adjusting rod is operatively coupled to the drive through a coupling comprising a first sprocket coupled to the drive, said first sprocket being coupled to a chain and said chain being coupled to a second sprocket which is also coupled to the at least one adjusting rod.

18. The adjustor of claim 12, wherein the adjusting rod is operatively coupled to the drive through a coupling comprising a first pulley coupled to the drive, said first pulley being coupled to a belt and said belt being coupled to a second pulley which is also coupled to the at least one adjusting rod.

* * * * *